United States Patent
Zewail et al.

(10) Patent No.: US 12,432,613 B2
(45) Date of Patent: Sep. 30, 2025

(54) DATA SCRAMBLING IN RATE-SPLIT COMMUNICATIONS

(71) Applicant: QUALCOMM Incorporated, San Diego, CA (US)

(72) Inventors: Ahmed Abdelaziz Ibrahim Abdelaziz Zewail, San Diego, CA (US); Mostafa Khoshnevisan, San Diego, CA (US); Jing Sun, San Diego, CA (US); Xiaoxia Zhang, San Diego, CA (US); Zhifei Fan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 418 days.

(21) Appl. No.: 17/962,430

(22) Filed: Oct. 7, 2022

(65) Prior Publication Data

US 2024/0121662 A1   Apr. 11, 2024

(51) Int. Cl.
*H04L 25/02* (2006.01)
*H04L 25/03* (2006.01)
*H04W 28/06* (2009.01)

(52) U.S. Cl.
CPC ....... *H04W 28/06* (2013.01); *H04L 25/03866* (2013.01)

(58) Field of Classification Search
CPC . H04W 28/06; H04W 74/0833; H04W 72/02; H04W 4/06; H04L 25/03866; H04L 25/0202; H04L 5/0053; H04L 5/001; H04L 5/0048; H04L 5/0044; H04L 5/0094
See application file for complete search history.

(56) References Cited

U.S. PATENT DOCUMENTS

| | | | |
|---|---|---|---|
| 2019/0068342 A1* | 2/2019 | Kumar Parameswarn Rajamma | H04W 72/542 |
| 2020/0275492 A1* | 8/2020 | Lei | H04W 74/0808 |
| 2020/0323024 A1* | 10/2020 | Huang | H04L 12/185 |
| 2022/0104187 A1* | 3/2022 | Zhou | H04L 1/1812 |
| 2022/0150997 A1* | 5/2022 | Xu | H04W 4/06 |
| 2022/0400475 A1* | 12/2022 | Suh | H04W 72/23 |

(Continued)

FOREIGN PATENT DOCUMENTS

WO   WO-2022087482 A1 *   4/2022   ............. H04L 5/001

OTHER PUBLICATIONS

ETSI TS 138 211 V15.8.0 (Jan. 2020) (Year: 2020).*

*Primary Examiner* — Kevin T Bates
*Assistant Examiner* — Yonghong Zhao
(74) *Attorney, Agent, or Firm* — Holland & Hart LLP

(57) ABSTRACT

Aspects provide communication methods, apparatuses and computer-readable mediums. According to an aspect, there is provided a method for wireless communication at a network entity. The method comprises: splitting a first individual message associated with a first device into at least a first common part and a first private part; splitting a second individual message associated with a second device into at least a second common part and a second private part; combining the first common part and the second common part to provide a common message; assigning a common group identifier to a group of devices comprising the first device and the second device; processing the common message, wherein the processing comprises scrambling the common message using the common group identifier; and transmitting the processed common message to the group of devices.

29 Claims, 8 Drawing Sheets

(56) References Cited

U.S. PATENT DOCUMENTS

2023/0050307 A1* 2/2023 Zhou ................... H04W 72/23
2024/0260134 A1* 8/2024 Babaei ................. H04W 68/02

* cited by examiner

DATA SCRAMBLING IN RATE-SPLIT COMMUNICATIONS

BACKGROUND

Field of the Disclosure

The present disclosure relates to data scrambling in communications using rate-splitting techniques.

Description of Related Art

Rate-splitting techniques in communication systems involve splitting messages for individual users into a common part and a private part. The common part is common to multiple users and the private part is specific to a given user. The parts are processed at a network entity, such as, for example, a base station, and transmitted to the respective users. In order for a wireless device (e.g., a user equipment or wireless node) to successfully receive an individual message, the wireless device must be able to process the received common part and the received private part to reconstruct the message.

The processing comprises scrambling the data (for example, the common part and the private part) at the network entity and descrambling the data at the wireless device. The descrambling by the wireless device (e.g., the user equipment) requires knowledge of variables used by the network entity to scramble the messages, with such variables including identifiers associated with the users. The scrambling is dependent on identifiers which are user specific, i.e. user specific scrambling. However, since the common part is common to multiple users, user specific scrambling may be problematic and it may not be possible for all of the users to successfully process (e.g., descramble) the received data. In other words, scrambling data using a scrambling method that is user specific may not be compatible with data that is common to multiple users.

It is therefore desirable for the data that is common to a group of users to be scrambled in a way that enables each of the users to descramble the data.

SUMMARY

According to an embodiment of a first aspect, there is provided a method for wireless communication at a network entity, the method comprising: splitting a first individual message associated with a first device into at least a first common part and a first private part; splitting a second individual message associated with a second device into at least a second common part and a second private part; combining the first common part and the second common part to provide a common message; assigning a common group identifier to a group of devices comprising the first device and the second device; processing the common message, wherein the processing comprises scrambling the common message using the common group identifier; and transmitting the processed common message to the group of devices.

A common identifier is therefore assigned to a group of devices and used in the processing of the common message. The common message is common to the group of devices as it comprises portions of the individual messages associated with (for example, intended for) the devices of the group of devices, such as the first device and the second device. That is, the common message may comprise a portion of the individual message associated with the first device and portion of the individual message associated with the second device. The first device and the second device are examples of wireless devices or wireless nodes and may, for example, each be a user equipment.

Processing the common message comprises scrambling the message using the common group identifier. Since the identifier is assigned to the group of devices, each of the devices may be able to descramble the common message. In other words, the identifier used to scramble the common message is not user specific but is common to the group of devices. The common group identifier may be known to each device of the group of devices such that each device is able to descramble the common message. Thus, the assignment and the use of the common group identifier may enable the common message to be scrambled in a way that enables each of the users to descramble the data. The advantages associated with data scrambling may therefore be realized while ensuring that the scrambled message may be decoded by the intended recipients.

The group of devices may comprise more than two devices, i.e. more devices that the first device and the second device. In such a case, each individual message associated with a device of the group of devices may be split into a common part and a private part, and all of the common parts of the group may be combined to provide the common message. The group of devices may comprise all of the devices connected to the network entity (e.g., base station). That is, the group of devices may comprise all of the devices located in the cell of the network entity and to which the network entity is providing access to the network, i.e. within the coverage area of the network entity (e.g., base station). Alternatively, the group of devices may be a subset of the devices located in the cell. The group of devices may be referred to as a common group or a common group of devices. It is noted that the transmission of the processed common message to the group of devices may be direct or indirect. For example, the transmission by the network entity may be relayed by another device to one or more devices of the group of devices. Transmission of the processed common message may be with the group of devices as the intended recipients. However, from the point of view of the network entity, it may be considered that the processed common message is transmitted.

The common group identifier may be configured using radio resource control. In other words, the common group identifier may be broadcast in addition to, or as part of, system information. Configuring the common group identifier using the radio resource control (RRC) may ensure that the identifier is communicated to the group of devices. Configuring the common group identifier in the RRC may therefore ensure that the identifier is known to all of the devices of the group of devices such that the devices have the information required to descramble the common message. The common group identifier may also be communicated to the devices of the group of devices in other ways. For example, the identifier may be notified in specific messages, broadcast messages, or through communications in other layers of the protocol stack, such as, for example, the Media Access Control (MAC) sublayer, via the MAC Control Element (MAC-CE).

The common group identifier may be a cell identifier. The cell identifier may be an identifier of a cell provided by the network entity. The common group identifier may therefore be the cell identifier associated with the cell of the network entity (e.g., base station), such that the cell identifier is used in the data scrambling of the common message. Using the cell identifier may be more efficient than using a different identifier since the cell identifier is known to the wireless devices connected to the network entity. This may therefore reduce the configuration required by the network entity and may ensure that the common group identifier is known to the group of devices. This may be particularly efficient in a case in which the group of devices comprises all of the wireless devices or a subset of the devices connected to the network entity in the cell.

The common group identifier may be offset from a cell identifier. The cell identifier may be an identifier of a cell provided by the network entity.

The common group identifier may therefore be offset from the cell identifier associated with the cell of the network entity (e.g., base station). This may enable simpler configuration of the common group identifier since the identifier may be configured with respect to the cell identifier. The offset may be hard coded in the configuration of the network entity which may further improve the efficiency and ensure that the common group identifier is known to the group of identifiers.

The offset may be configured using radio resource control. Configuring the offset using the RRC may ensure that the offset is communicated to the group of devices. Configuring the offset in the RRC may therefore ensure that the identifier, which may be offset from the cell identifier, is known to all of the devices of the group of devices such that the devices are able to descramble the common message. The offset may also be configured using the Media Access Control (MAC) sublayer, via the MAC Control Element (MAC-CE).

The common message may be scrambled using the following equation:

$$c_{init}=n_{RNTI}\cdot 2^{15}+q\cdot 2^{14}+N_{IDc}$$

where $n_{RNTI}$ is the radio network temporary identifier associated with the downlink control information scheduling the transmission of the processed common message, q is an identifier to indicate that the equation relates to the common message, and $N_{IDc}$ is the common group identifier.

The above equation may therefore be used to scramble the common message, with the common group identifier provided in the equation. The equation may be considered as a data scrambling initialization equation. The identifier q may be 1 bit and, in some cases, may be equal to 0 to indicate that the equation relates to the common message. The identifier may also be considered as a codeword (CW) index. The identifier q may be a different value for the scrambling of other messages, e.g., the private part of a message. $n_{RNTI}$ may be equal to the Cell Radio Network Temporary Identifier (C-RNTI) or may be equal to another RNTI value that is used to scramble the common message and which may be newly generated.

The same radio network temporary identifier may be configured for the group of devices. The RNTI configured by the network entity may therefore be common for the group of devices. In other words, the RNTI to be used for scheduling the DCIs of all of the devices in the group of devices may be the same. This may therefore ensure that the RNTI is common for all of the devices to which the common message relates. The RNTI may be configured using RRC.

The method may comprise generating the common group identifier, wherein the common group identifier may be different to a cell identifier. The cell identifier may be an identifier of a cell provided by the network entity. The common group identifier may therefore be generated by the network entity and may be different from the cell identifier.

Processing the common message may further comprise: encoding the common message; and/or modulating the common message; and/or mapping the common message to one or more transmission layers; and/or precoding the common message.

Processing the common message may therefore comprise one or more steps in addition to scrambling. One or more of the further processing steps may be performed and they may be performed in any order. The specific steps of the processing used may be application dependent. The processing may comprise initially encoding the common message, then scrambling the common message using the common identifier, then modulating the common message, followed by mapping the common message and finally precoding the common message before transmitting it. The scrambling may be considered to be part of the encoding stage, such that the encoding comprises scrambling the common message using the common identifier.

The method may comprise: assigning a first identifier to the first device; and processing the first private part. The processing may comprise scrambling the first private part using the first identifier; and transmitting the processed first private part to the first device.

Therefore, unlike the common message, the private part of the first individual message associated with the first device may be scrambled using an identifier that is assigned to the first device and that is not common to a group of devices. In other words, the first identifier may be unique to the first device and not associated with any other devices in the cell. The scrambling of the first private part may therefore be user specific. Once processed, the first private part is transmitted to the first device. The first private part may also be referred to as a first private message. The first identifier may also be referred to as a first user identifier, a first individual identifier, or the like.

The first private part may be scrambled using the following equation:

$$c_{init}=n_{RNTI}\cdot 2^{15}+q\cdot 2^{14}+N_{ID},$$

where $n_{RNTI}$ is a radio network temporary identifier associated with the downlink control information scheduling the transmission of the processed first private part, q is a codeword index, and $N_{ID}$ is the first identifier.

The above equation may therefore be used to scramble the private part of the individual message for the first device, with the first identifier provided in the equation. The equation may be considered as a data scrambling initialization equation. The codeword index may also be referred to as a CW index. The CW index q may be 1 bit and, in some cases, may be equal to 1 to indicate that the equation relates to the private part of a message. The CW index q may be a different value for the scrambling of other messages, e.g., the common message. $n_{RNTI}$ may be equal to the Cell Radio Network Temporary Identifier (C-RNTI). $n_{RNTI}$ may be unique to the first device.

Processing the first private part may further comprise: encoding the first private part; and/or modulating the first private part; and/or mapping the first private part to one or more transmission layers; and/or precoding the first private part.

Processing the first private part may therefore comprise one or more steps in addition to scrambling. One or more of the further processing steps may be performed and they may be performed in any order. The specific steps of the processing used may be application dependent. The processing may comprise initially encoding the first private part, then scrambling the first private part using the first identifier, then modulating the first private part, followed by mapping the first private part and finally precoding the first private part before transmitting it to the first device. The scrambling may be considered to be part of the encoding stage, such that the encoding comprises scrambling the first private part using the first identifier.

The method may comprise: assigning a second identifier to the second device; and processing the second private part. The processing may comprise scrambling the second private part using the second identifier; and transmitting the processed second private part to the second device.

Therefore, unlike the common message and similarly to the first private part, the private part of the second individual message associated with the second device may be scrambled using an identifier that is assigned to the second device and that is not common to a group of devices. In other words, the second identifier may be unique to the second device. The scrambling of the second private part may therefore be user specific. Once processed, the second private part is transmitted to the second device. The second private part may also be referred to as a second private message. The second identifier may also be referred to as a second user identifier, a second individual identifier, or the like.

The second private part may be scrambled using the following equation:

$$c_{init} = n_{RNTI} \cdot 2^{15} + q \cdot 2^{14} + N_{ID},$$

where $n_{RNTI}$ is a radio network temporary identifier associated with the downlink control information scheduling the transmission of the processed second private part, q is a codeword (CW) index, and $N_{ID}$ is the second identifier.

The above equation may therefore be used to scramble the private part of the individual message for the second device, with the second identifier provided in the equation. The equation may be considered as a data scrambling initialization equation. The codeword index may also be referred to as a CW index. The CW index q may be 1 bit and, in some cases, may be equal to 1 to indicate that the equation relates to the private part of a message. The CW index q may be a different value for the scrambling of other messages, e.g., the common message. $n_{RNTI}$ may be equal to the Cell Radio Network Temporary Identifier (C-RNTI). $n_{RNTI}$ may be unique to the second device.

Processing the second private part may further comprise: encoding the second private part; and/or modulating the second private part; and/or mapping the second private part to one or more transmission layers; and/or precoding the second private part.

Processing the second private part may therefore comprise one or more steps in addition to scrambling. One or more of the further processing steps may be performed and they may be performed in any order. The specific steps of the processing used may be application dependent. The processing may comprise initially encoding the second private part, then scrambling the second private part using the second identifier, then modulating the second private part, followed by mapping the second private part and finally precoding the second private part before transmitting it to the second device. The scrambling may be considered to be part of the encoding stage, such that the encoding comprises scrambling the second private part using the second identifier.

The network entity may be one of a plurality of network entities. The processed common message may be transmitted to another network entity of the plurality of network entities.

The processed common message may therefore be transmitted to another network entity (e.g., base station) so that the other network entity may transmit the processed common message to one or more devices of the group of devices. The processed common message may be transmitted to the other network entity using any suitable communication link, such as, for example, a backhaul interface. This approach may be used as part of a Coordinated Multipoint system comprising the network entity and the other network entity. It may be beneficial for the other network entity to provide the processed common message to one or more devices of the group of devices if, for example, the device is located closer to the other network entity. Communicating the processed message to the other network entity may therefore increase the likelihood that the message is received by the devices of the group of devices, thereby increasing the reliability and efficiency of the system.

According to an embodiment of a second aspect, there is provided a method for wireless communication at a wireless device, the method comprising: receiving a first signal comprising a common message, wherein the common message comprises part of a rate-split message associated with the wireless device; receiving a common group identifier; and processing the common message, wherein the processing comprises descrambling the common message using the common group identifier.

A common identifier is therefore used to descramble a common message received as a first signal. The common message comprises part of a rate-split message and may comprise information that indicates that the message is common to a group of wireless devices. The wireless device receives the common group identifier and then uses the common group identifier in the processing to descramble the common message within the first signal. The common message may therefore be successfully descrambled when the common group identifier is also used to scramble the common message prior to it being communicated to the wireless device. The common message and the common group identifier may both be common to a group of devices comprising the wireless device, such that each device in the group of devices may be able to descramble the common message in the same way. Thus, the receipt of and the use of the common group identifier in the descrambling may enable the common message to be successfully descrambled at each wireless device with which the common message is associated. The advantages associated with data scrambling may therefore be realized while ensuring that the scrambled message may be decoded by the wireless device, and any other intended recipients. The wireless device may also be referred to as a first wireless device, a wireless node, or a user equipment.

The common group identifier may be configured using radio resource control. In other words, the common group identifier may be received in addition to, or as part of, system information. Configuring the common group identifier using the radio resource control (RRC) may ensure that the identifier is received at the wireless device and any other devices that may be part of a group comprising the wireless device. Configuring the common group identifier in the RRC may therefore ensure that the identifier is known to the relevant devices such that the devices, including the wireless device, are able to descramble the common message. The common group identifier may also be received in other ways. For example, the identifier may be received in specific messages, broadcast messages, or through communications in other layers of the protocol stack, such as, for example, the Media Access Control (MAC) sublayer, via the MAC Control Element (MAC-CE).

The common group identifier may be associated with a group of devices comprising the wireless device. The common group identifier may therefore be assigned to each device of a group of devices including the wireless device. The group of devices may be the devices to which the common message is common. That is, the common message is associated with all of the devices of the group of devices and the common message comprises information associated with each of the devices. Since the common message comprises part of a rate-split message, the common message may be formed of the common parts of two or more individual messages for different users, where the users correspond to the group of devices. Each device of the group of devices may receive the common message and the common group identifier, and may descramble the common message using the common group identifier.

The common message and/or the common group identifier may be received from a network entity. In other words, the common message and/or the common group identifier may be communicated to the wireless device from a network entity, such as, for example, a base station. This communication may be direct or indirect. For example, the common message and/or the common group identifier may originate from the network entity but may be relayed by another network entity or wireless device. The network entity from which the common message and the common group identifier is communicated may rate-split a message to provide the common message and scramble the common message using the common group identifier. That is, the received common message may have been scrambled prior to being communicated to the wireless device and therefore requires descrambling at the wireless device. The rate-split message may be an individual message associated with (e.g., intended for) the wireless device.

The method may comprise: receiving a second signal comprising a private part of the rate-split message; receiving a device identifier associated with the wireless device; and processing the private part. The processing may comprise descrambling the private part using the device identifier and the descrambled common message.

A private part of the rate-split message may therefore be received by the wireless device and may be descrambled using a device identifier that is assigned to and received by the wireless device. In contrast to the common group identifier, the device identifier may be unique to the wireless device. The private part of the message may therefore only be descrambled by the wireless device. The private part may therefore be scrambled and descrambled in a user specific manner. Processing of the private part may further comprise estimating an effective channel corresponding to the received second signal and descrambling the private part using the device identifier and the estimated effective channel. The effective channel estimation may be based on the implementation of the wireless device. For example, it may be based on the DMRS port associated with the private message.

Descrambling the private part may comprise using successive interference cancelation. Successive interference cancelation may therefore be used to decode the private part. The successive interference cancelation may comprise: estimating an effective first channel corresponding to the received first signal; reconstructing the descrambled common message to provide a reconstructed signal; multiplying the reconstructed signal by the estimated effective channel to provide a multiplied signal; subtracting the multiplied signal from the received first signal to provide a subtracted signal; and descrambling the private part using the subtracted signal, the device identifier and the estimated effective second channel.

The method may comprise combining the processed common message and the processed private part of the rate-split message to provide an individual message associated with the wireless device.

In other words, the rate-split message may be reconstructed at the wireless device using the descrambled common message and the descrambled private part. The combined message may provide an individual message that was intended for the wireless device and was communicated by, for example, the network entity (e.g., base station). The use of the common group identifier in the scrambling and descrambling of the common message and the device identifier in the scrambling and descrambling of the private part may therefore enable the wireless device to successfully decode and combine the received signals to acquire the individual message. Such reconstruction of the individual message may not be achieved by other wireless devices since the private part and the device identifier may be unique to the wireless device.

The device identifier may be received from a network entity and may be different to the common group identifier. That is, the device identifier may be communicated to the wireless device from a network entity, such as, for example, a base station. This communication may be direct or indirect. For example, the device identifier may originate from the network entity but may be relayed by another network entity or wireless device. The network entity from which the device identifier is communicated may also communicate the private part to the wireless device and may have rate-split an individual message associated with the wireless device to provide the private part and the common part. The network entity may scramble the private part using the device identifier. That is, the received private part may have been scrambled prior to being communicated to the wireless device and may therefore require descrambling at the wireless device.

The device identifier may be configured using radio resource control. That is, the device identifier may be broadcast in addition to, or as part of, system information. Configuring the device identifier using the radio resource control (RRC) may ensure that the identifier is effectively communicated to the wireless device. Configuring the device identifier in the RRC may therefore ensure that the identifier is known to the device such that the device is able to descramble the private part. The device identifier may also be communicated to the wireless device in other ways. For example, the identifier may be notified in specific messages, broadcast messages, or through communications in other layers of the protocol stack, such as, for example, the Media Access Control (MAC) sublayer, via the MAC Control Element (MAC-CE).

The device identifier may be uniquely associated with the wireless device. In other words, the device identifier may be unique to the wireless device and other wireless devices may have different device identifiers. The other device identifiers may be assigned by a network entity, e.g., a base station. The other wireless devices may comprise other devices associated with the common message, such that each device associated with common message may share a common group identifier and have a unique individual identifier.

The common group identifier may be a cell identifier. The cell identifier may be an identifier of a cell provided by a network entity. The wireless device may be located in the cell.

The common group identifier may therefore be the cell identifier associated with the cell of the network entity (e.g., base station), such that the cell identifier may be used in the descrambling of the common message. Using the cell identifier may be more efficient than using a different identifier since the cell identifier is known to the wireless device and other wireless devices connected to the network entity. This may therefore reduce the configuration required by the network entity and may ensure that the common group identifier is known to the wireless device.

According to an embodiment of a third aspect, there is provided an apparatus for wireless communication at a network entity, the apparatus comprising: means for splitting a first individual message associated with a first device into at least a first common part and a first private part; means for splitting a second individual message associated with a second device into at least a second common part and a second private part; means for combining the first common part and the second common part to provide a common message; means for assigning a common group identifier to a group of devices comprising the first device and the second device; means for processing the common message, wherein the processing comprises scrambling the common message using the common group identifier; and means for transmitting the processed common message to the group of devices.

According to an embodiment of a fourth aspect, there is provided an apparatus for wireless communication at a wireless device, the apparatus comprising: means for receiving a first signal comprising a common message, wherein the common message comprises part of a rate-split message associated with the wireless device; means for receiving a common group identifier; and means for processing the common message, wherein the processing comprises descrambling the common message using the common group identifier.

According to an embodiment of a fifth aspect, there is provided a computer-readable medium comprising instructions which, when executed by a processor, cause to processor to: split a first individual message associated with a first device into at least a first common part and a first private part; split a second individual message associated with a second device into at least a second common part and a second private part; combine the first common part and the second common part to provide a common message; assign a common group identifier to a group of devices comprising the first device and the second device; process the common message, wherein the processing comprises scrambling the common message using the common group identifier; and transmit the processed common message to the group of devices.

According to an embodiment of a sixth aspect, there is provided a computer-readable medium comprising instructions which, when executed by a processor, cause to processor to: receive a first signal comprising a common message, wherein the common message comprises part of a rate-split message associated with the wireless device; receive a common group identifier; and process the common message, wherein the processing comprises descrambling the common message using the common group identifier.

According to an embodiment of a seventh aspect, there is provided an apparatus for wireless communication, the apparatus comprising: a memory; and a processor communicatively coupled to the memory, wherein the processor is configured to: split a first individual message associated with a first device into at least a first common part and a first private part; split a second individual message associated with a second device into at least a second common part and a second private part; combine the first common part and the second common part to provide a common message; assign a common group identifier to a group of devices comprising the first device and the second device; process the common message, wherein the processing comprises scrambling the common message using the common group identifier; and transmit the processed common message to the group of devices.

According to an embodiment of an eighth aspect, there is provided an apparatus for wireless communication, the apparatus comprising: a memory; and a processor communicatively coupled to the memory, wherein the processor is configured to: receive a first signal comprising a common message, wherein the common message comprises part of a rate-split message associated with the wireless device; receive a common group identifier; and process the common message, wherein the processing comprises descrambling the common message using the common group identifier.

Features and sub-features of the method and computer-readable medium aspects may be applied to the apparatus aspects and vice versa. An apparatus or computer-readable medium according to preferred embodiments of the present disclosure may comprise any combination of the method aspects. Methods or computer-readable mediums according to further embodiments may be described as computer-implemented in that they require processing and memory capability. Aspects relating to computer-readable mediums may also be considered as computer programs. For example, according to an embodiment of an aspect there is provided a computer program which when executed carries out a method for wireless communication according to an embodiment of an aspect of the disclosure. The computer-readable medium may be a non-transitory computer-readable medium.

The apparatus according to preferred embodiments is described as configured or arranged to or simply 'to' carry out certain functions. This configuration or arrangement could be by use of hardware or middleware or any other suitable system. The apparatus may comprise one or more processors and processes of the apparatus may be performed by a single processor or by multiple processors in combination. A single processor may therefore perform one or more of the processes of the apparatus. The memory and the one or more processors are communicably connected, for example, via a bus. The one or more processors may store and retrieve information from the memory, such as for example, intermediate data generated when performing the processes of the apparatus.

Aspects of the disclosure may be implemented in digital electronic circuitry, or in computer hardware, firmware, software, or in combinations of them. Aspects of the disclosure may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a standalone program or as a module, component, subroutine, or other unit suitable for use in a data processing environment. A computer program may be deployed to be executed on one module or on multiple modules at one site or distributed across multiple sites and interconnected by a communication network.

Method steps according to aspects of the disclosure may be performed by one or more programmable processors executing a computer program to perform functions of the disclosure by operating on input data and generating output. An apparatus according to aspects of the disclosure may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The disclosure is described in terms of particular embodiments. Other embodiments are within the scope of the following claims. For example, the steps of the disclosure may be performed in a different order and still achieve desirable results.

Elements of the disclosure have been described using the terms "memory", "processor", etc. The skilled person will appreciate that such terms and their equivalents may refer to parts of the system that are spatially separate but combine to serve the functions defined. Equally, the same physical parts of the system may provide two or more of the functions defined. For example, separately defined means may be implemented using the same memory and/or processor as appropriate.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope, which is defined in the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

Exemplary embodiments will now be described, by way of example only, with reference to the following drawings, in which.

DETAILED DESCRIPTION

Figure 1:
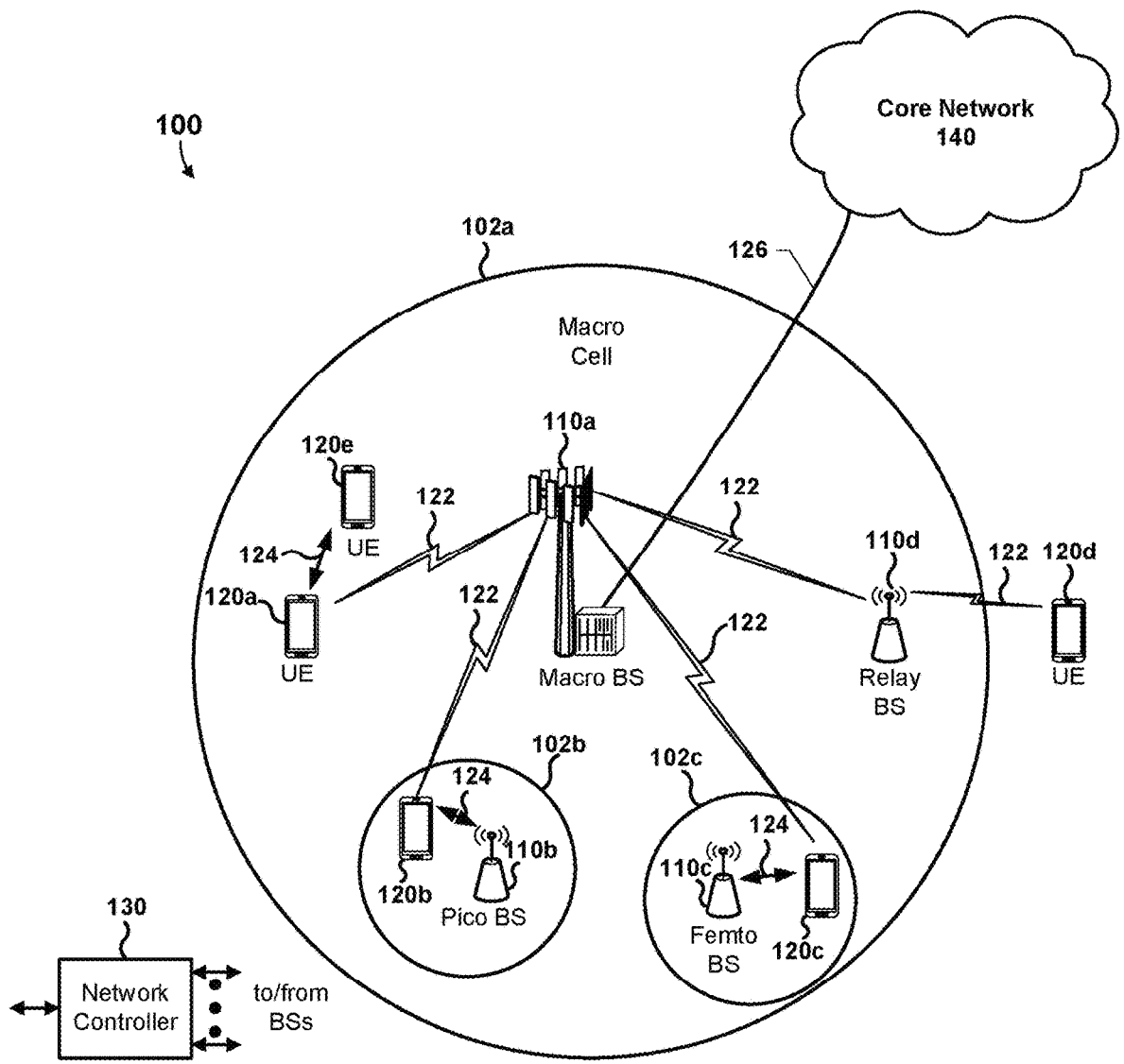
FIG. 1 is system block diagram illustrating an example communication system suitable for implementing any of the various embodiments.

Embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise. The words "comprises/comprising" and the words "having/including" when used herein with reference to the present disclosure are used to specify the presence of stated features, integers, steps or components but does not preclude the presence or addition of one or more other features, integers, steps, components or groups thereof.

Unless defined otherwise, all technical and scientific terms used herein have the same meanings as commonly understood by one of ordinary skill in the art to which the embodiments of the present disclosure belong. Preferred methods, devices, and processes are described, although any methods, devices and processes similar or equivalent to those described herein may be used in the practice or testing of the embodiments.

Embodiments of aspects may provide communication methods, apparatuses and computer-readable mediums which enable data that is common to a group of users to be scrambled in a way that enables each of the users to descramble the data. Accordingly, embodiments of aspects may also provide communication methods, apparatuses and computer-readable mediums which enable scrambled data that is commonly communicated to a group of users to be descrambled by each of the users.

Embodiments of aspects may be applicable to multiple telecommunication standards. LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet-switched (PS) services. Data services in LTE may be provided over the Internet, while multimedia services may be supported by the IP Multimedia Core Network Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN). One implementation option for 5GNR networks being adopted is a 5GNR standalone (SA) network in which a 5G radio access network (RAN) and 5G core network provide 5GNR services in geographic area, such as a country. As such, 5GNR SA networks can overlap coverage in the geographic area, such as the country, with LTE networks. Embodiments of the present disclosure may be applicable to a number of wireless communications technologies, including, but not limited to, 3G, 4G, 5G, 6G/5G-advanced.

FIG. 1 is a system block diagram illustrating an example communication system 100 suitable for implementing any of the various embodiments. The communications system 100 may, for example, be a 5G New Radio (NR) network, or any other suitable network, such as an LTE network 5GNR SA network, etc.

The communications system 100 may include a heterogeneous network architecture that includes a core network 140 and a variety of mobile devices (illustrated as wireless devices 120a-120e in FIG. 1). The communications system 100 may also comprise a plurality of network entities, such as, for example, base stations (illustrated as the BS 110a, the BS 110b, the BS 110c, and the BS 110d) and other network entities. A base station is an entity that communicates with wireless devices (mobile devices), and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB) or the like. Each network entity (e.g., base station) may provide communication coverage for a particular geographic area. In 3GPP, the term "cell" can refer to a coverage area of a network entity (e.g., base station), a base station Subsystem serving this coverage area, or a combination thereof, depending on the context in which the term is used.

A network entity (e.g., base station 110a-110d) may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5GNB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, a network entity, a user equipment, etc.

A macro base station 110a may communicate with the communication network 140 over a wired or wireless communication link 126. The wireless devices 120a, 120b, 120c may communicate with a base station 110a-110d over a wireless communication link 122.

While descriptions of some embodiments may use terminology and examples associated with LTE technologies, various embodiments may be applicable to other wireless communications systems, such as a New Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

In some embodiments, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, Resource selection operations, as well as other operations described elsewhere herein as being performed by the base station 110a.

Figure 2:
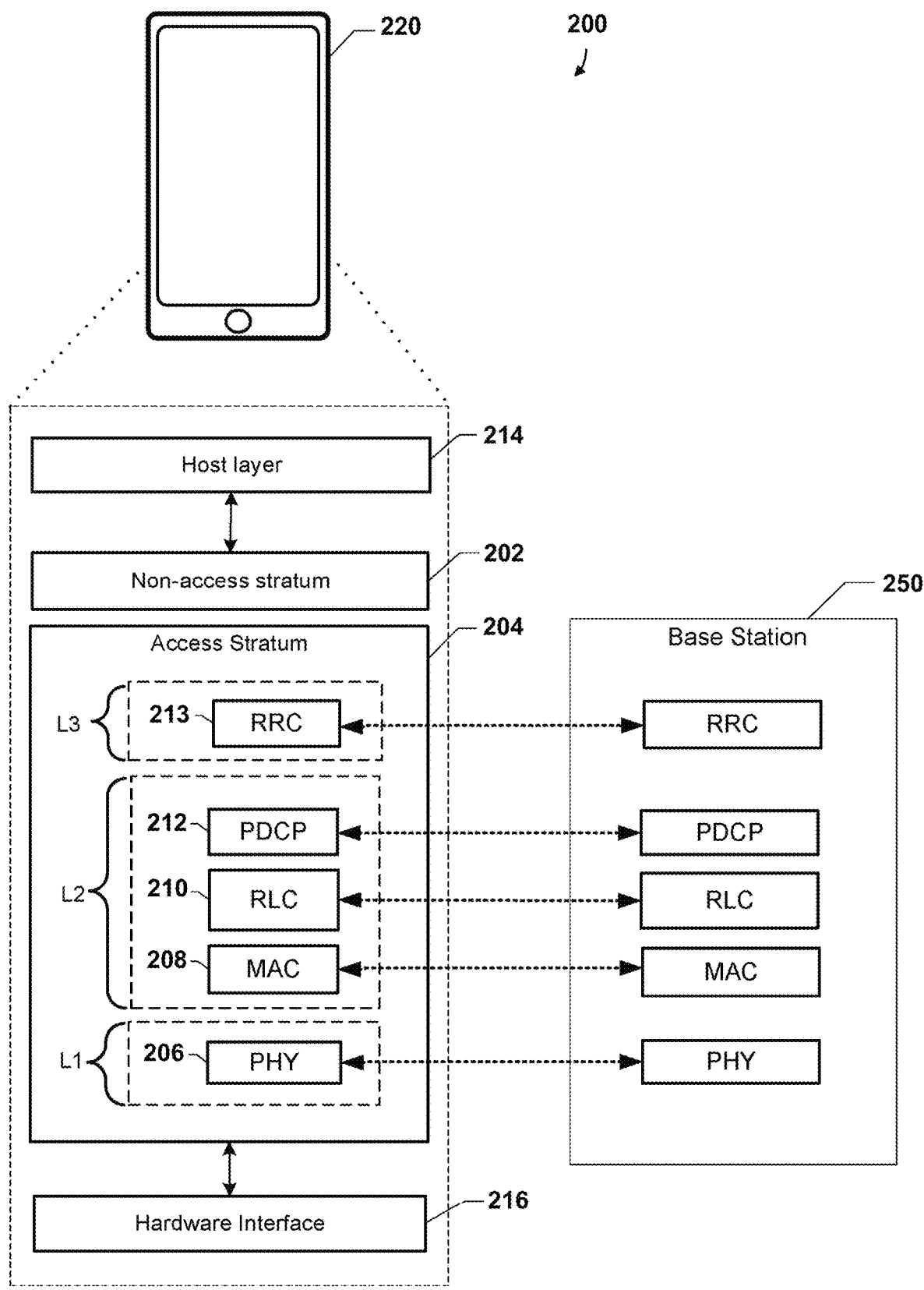
FIG. 2 is a component block diagram illustrating a software architecture including a radio protocol stack for the user and control planes in wireless communications suitable for implementing any of the various embodiments.

FIG. 2 is a component block diagram illustrating a software architecture 200 including a radio protocol stack for the user and control planes in wireless communications suitable for implementing any of the various embodiments. With reference to FIG. 1, the wireless device 220 may implement the software architecture 200 to facilitate communication between a wireless device 220 (e.g., the wireless device 120a-120e) and the base station 250 (e.g., the base station 110a) of a communication system (e.g., 100). In various embodiments, layers in software architecture 200 may form logical connections with corresponding layers in software of the base station 250. The software architecture 200 may be distributed among one or more processors. While illustrated with respect to one Radio protocol stack, the software architecture 200 may include multiple protocol stacks. While described below with reference to LTE communication layers, the software architecture 200 may support any of variety of standards and protocols for wireless communications, and/or may include additional protocol stacks that support any of variety of standards and protocols wireless communications.

The software architecture 200 may include a Non-Access Stratum (NAS) 202 and an Access Stratum (AS) 204. The NAS 202 may include functions and protocols to support Packet filtering, security management, mobility control, session management, and traffic and signaling between a SIM(s) of the wireless device and its core network 140. The AS 204 may include functions and protocols that support communication between a SIM(s) and entities of supported access networks (e.g., a base station). In particular, the AS 204 may include at least three layers (Layer 1, Layer 2, and Layer 3), each of which may contain various sub-layers.

In the user and control planes, Layer 1 (L1) of the AS 204 may be a physical layer (PHY) 206, which may oversee functions that enable transmission and/or reception over the air interface. Examples of such physical layer 206 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 204 may be responsible for the link between the wireless device 220 and the base station 250 over the physical layer 206. In the various embodiments, Layer 2 may include a Media Access Control (MAC) sublayer 208, a Radio link Control (RLC) sublayer 210, and a Packet data convergence protocol (PDCP) 212 sublayer, each of which form logical connections terminating at the base station 250.

In the control plane, Layer 3 (L3) of the AS 204 may include a Radio Resource Control (RRC) sublayer 3. While not shown, the software architecture 200 may include additional Layer 3 sublayers, as well as various upper layers above Layer 3. In various embodiments, the RRC sublayer 213 may provide functions including broadcasting system information, paging, and establishing and releasing an RRC signaling connection between the wireless device 220 and the base station 250. This may comprise the common group identifier and/or device identifiers according to aspects of the disclosure.

In various embodiments, the PDCP sublayer 212 may provide uplink functions including multiplexing between different Radio bearers and logical channels, sequence number addition, handover data handling, integrity protection, ciphering, and header compression. In the downlink, the PDCP sublayer 212 may provide functions that include in-sequence delivery of data packets, duplicate data Packet detection, integrity validation, deciphering, and header decompression.

In the uplink, the RLC sublayer 210 may provide segmentation and concatenation of upper layer data packets, retransmission of lost data packets, and Automatic Repeat Request (ARQ). In the downlink, while the RLC sublayer 210 functions may include reordering of data packets to compensate for out-of-order reception, reassembly of upper layer data packets, and ARQ.

In the uplink, MAC sublayer 208 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 200 may provide functions to transmit data through physical media, the software architecture 200 may further include at least one host layer 214 to provide data transfer services to various applications in the wireless device 220. In some embodiments, application-specific functions provided by the at least one host layer 214 may provide an interface between the software architecture and a processor of the wireless device.

In other embodiments, the software architecture 200 may include one or more higher logical layers (e.g., transport, session, presentation, application, etc.) that provide host layer functions. For example, in some embodiments, the software architecture 200 may include a network layer (e.g., IP layer) in which a logical connection terminates at a packet data network (PDN) gateway (PGW). In some embodiments, the software architecture 200 may include an application layer in which a logical connection terminates at another device (e.g., end user device, server, etc.). In some embodiments, the software architecture 200 may further include in the AS 204 a hardware interface 216 between the physical layer 206 and the communication hardware (e.g., one or more RF transceivers).

As discussed above, the processing of rate-split messages requires scrambling a common message which is comprised of the common parts of individual messages associated with two or more wireless devices. The common message is scrambled using identifiers associated with the wireless devices. According to legacy scrambling techniques, the identifiers used in the scrambling are user specific. That is, legacy scrambling of the PDSCH is UE dependent. However, since the common message needs to be descrambled by each of the wireless devices associated with it, the identifiers need to be known to each of the devices. Thus, user specific identifiers can be problematic for common messages, i.e. transport blocks that are common to two or more devices. It is therefore desirable for the data that is common to a group of users to be scrambled in a way that enables each of the users to descramble the data.

Figure 3:
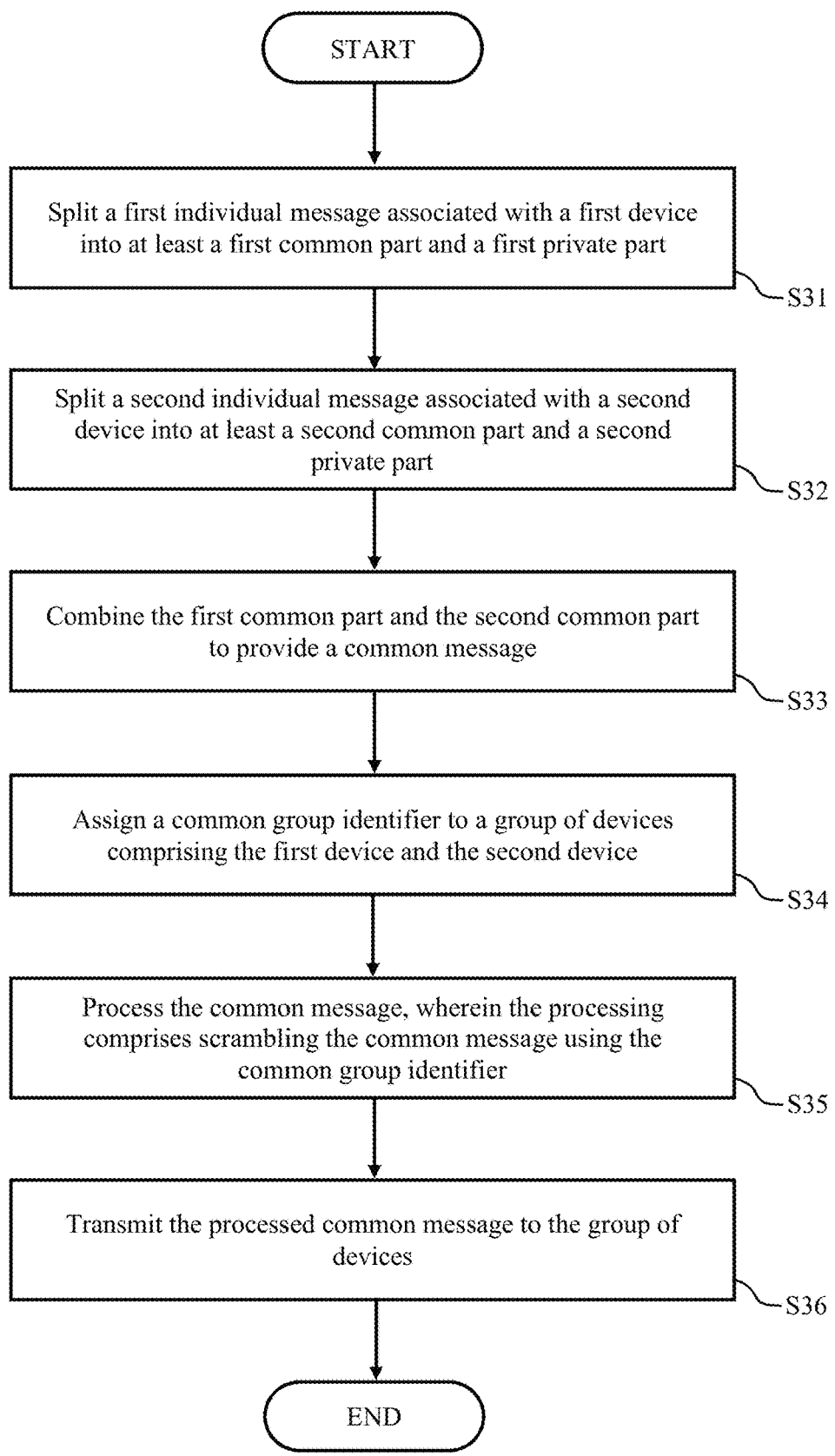
FIG. 3 is a flowchart of a method for wireless communication at a network entity according to an embodiment of an aspect of the disclosure.

FIG. 3 shows a flowchart of a method for wireless communication at a network entity according to an embodiment of an aspect of the disclosure. In step S31, a first individual message associated with a first device is split into at least a first common part and a first private part. At step S32, a second individual message associated with a second device is split into at least a second common part and a second private part. Then, at step S33, the first common part and the second common part are combined to provide a common message. A common group identifier is assigned to a group of devices comprising the first device and the second device at step S34. At step S35, the common message is processed, with the processing comprising scrambling the common message using the common group identifier. The processed common message is then transmitted to the group of devices at step S36.

Thus, a common group identifier is assigned to both the first and second devices, which are the devices associated with the common message. That is, the common message comprises the common part of an individual message for the first device and the common part of an individual message for the second device. The common message is then scrambled using the common identifier and transmitted, e.g., to the relevant devices (the first and second devices). The identifier is common to the devices and not user specific and so the common identifier may be known to each of the devices to allow them to descramble the common message. In other words, the scrambling of a common transport block (TB) is performed in a manner common to the relevant devices such that each of the users may be able to descramble the data. Embodiments of aspects may therefore allow scrambling the common stream (processed common message) while ensuring that it is decodable by all the users. Embodiments of aspects may be applicable to and compatible with systems using techniques such as, for example, Resource Spread Multiple Access (RSMA) and Multi-User MIMO (MU-MIMO).

The data scrambling initialization for the common message may use equation (1), shown below.

$$c_{init}=n_{RNTI} \cdot 2^{15}+q \cdot 2^{14}+N_{IDc} \tag{1}$$

In equation (1), $n_{RNTI}$ is the radio network temporary identifier associated with the downlink control information scheduling the transmission of the processed common message, q is an identifier to indicate that the equation relates to the common message, and $N_{IDc}$ is the common group identifier. Q may also be considered as a codeword index and may be 1 bit. q may be equal to 0 to indicate that the scrambling relates to a common message.

$n_{RNTI}$ may be C-RNTI, provided that C-RNTI is not UE dependent, i.e. provided the gNB has not assigned different C-RNTI values to different UEs. The gNB may use the same RNTI for scheduling DCIs of all the UEs in same RS transmission so that $n_{RNTI}$ is common among the UEs. That is, the same RNTI may be used for scheduling the DCIs of all the UEs. The RNTI may be configured via RRC.

Alternatively, $n_{RNTI}$ may be equal to a RNTI that is changed prior to scrambling the common message such that a new RNTI is used for the scrambling, i.e. a newly generated RNTI may be used in the data scrambling, e.g., in equation (1). The cell-RNTI may therefore remain unchanged and separate from the scrambling procedure, with no restrictions imposed on the choice of cell-RNTI. The network entity (e.g., gNB) may therefore configure different cell-RNTI values for different devices of the group of devices, without impacting the processing of the common message. The newly generated RNTI may be referred to as scrambling-RNTI or rate-splitting RNTI, such that $n_{RNTI}=RNTI_{scrambling}=RNTI_{rate-spitting}$. The rate-splitting RNTI may be used in the scrambling formula of the common message for all UEs, such that a common RNTI for the users is used to scramble the common message.

According to embodiments of aspects, the common group identifier is assigned to the group of users and used in the data scrambling initialization. The common group identifier may be the same as the cell ID, $NCell_{ID}$, i.e. $N_{IDc}=NCell_{ID}$. Thus, $NCell_{ID}$ may be used in scrambling the common message. This may be true even if $N_{ID}$ (the UE identifier) is RRC configured for some of the users that are receiving the common message. Thus, the user identifier may be overlooked (e.g., ignored by the base station) as part of the scrambling and replaced with the cell identifier as the common group identifier. The variable q in equation (1) will be different between common and private codewords even if the $N_{ID}$ is not configured. The common group identifier may alternatively be offset from the cell identifier, $NCell_{ID}$, i.e. $N_{IDc}=NCell_{ID}+offset$. The offset may be RRC configured or the offset may be hard coded.

Alternatively, the common group identifier may be a new ID generated for the common message. The base station may therefore generate the common group identifier and communicate it to the users. For example, it may configured via RRC. In some implementations, the common group identifier may preferably be generated and configured by the base station but if the ID is not configured then the cell identifier may be used as the common group identifier ($N_{IDc}=NCell_{ID}$), or the offset from the cell identifier may be used as the common group identifier ($N_{IDc}=NCell_{ID}+offset$), with the offset being, for example, hardcoded.

As an alternative to scrambling the common message using a common group identifier, the common message may not be scrambled. That is, no scrambling may be performed on the common message so that it is not necessary for the users to descramble the common message.

The private parts of messages are scrambled in a user specific manner, i.e. using user specific identifiers. The data scrambling initialization for each private part may use equation (2), shown below.

$$c_{init}=n_{RNTI}\cdot 2^{15}+q\cdot 2^{14}+N_{ID} \quad (2)$$

In equation (2), $n_{RNTI}$ is a radio network temporary identifier associated with the downlink control information scheduling the transmission of the private part, q is a codeword index, and $N_{ID}$ is the identifier associated with the device (e.g., the first identifier or the second identifier). q may be equal to 1 to indicate that the scrambling relates to a private message.

Figure 4:
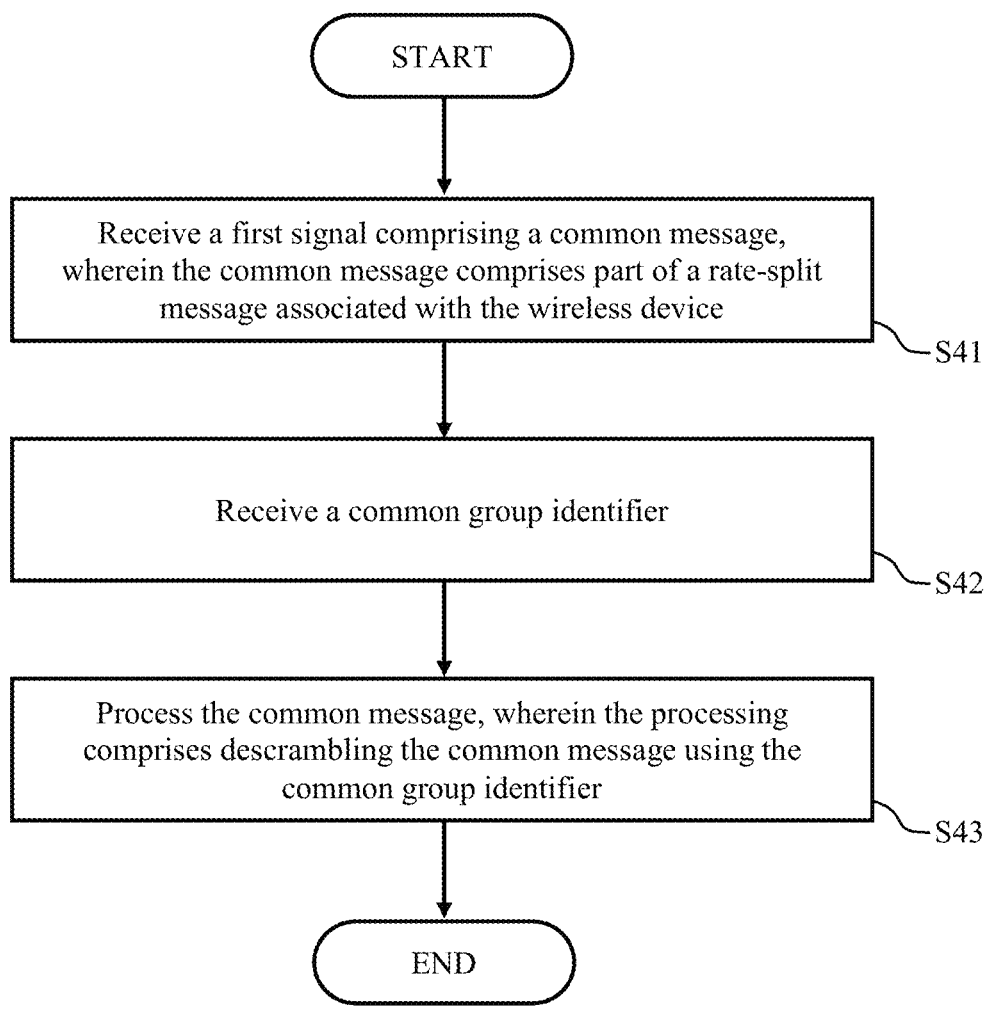
FIG. 4 is a flowchart of a method for wireless communication at a wireless device according to an embodiment of an aspect of the disclosure.

FIG. 4 shows a block diagram of a method for wireless communication at a wireless device according to an embodiment of an aspect of the disclosure. At step S41, a first signal comprising a common message is received, with the common message comprising part of a rate-split message associated with the wireless device. A common group identifier is received at step S42. Then the common message is processed at step S43, with the processing comprising descrambling the common message using the common group identifier.

Thus, the common group identifier is used at the wireless device to descramble the common message. In other words, an identifier common to a group of devices associated with the common message is used to descramble the common message, with the group of devices comprising the wireless device. The identifier is not user specific and so the identifier may be known to each device of the group of devices so that each device may descramble the common message and extract the part of the message that relates to the device.

Figure 5:
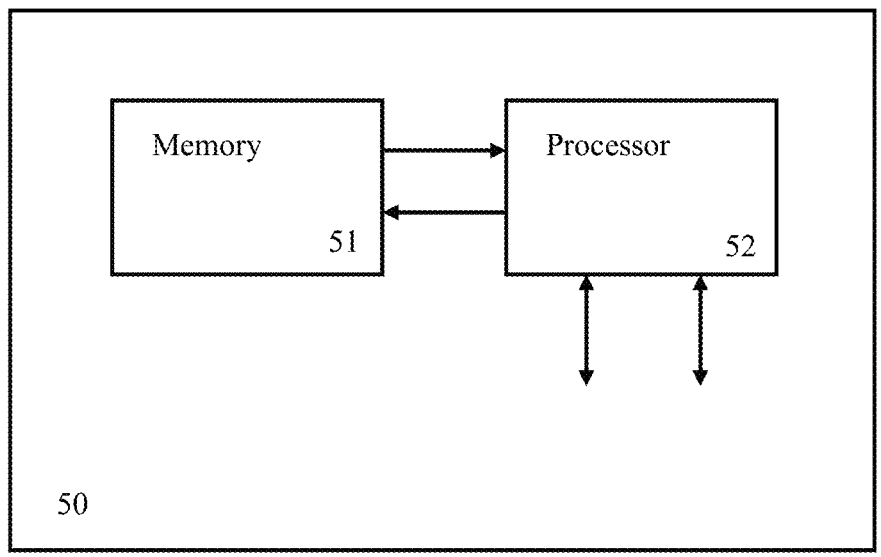
FIG. 5 is a block diagram of main apparatus components according to an embodiment of an aspect of the disclosure.

FIG. 5 shows a block diagram of main apparatus components according to an embodiment of an aspect of the disclosure. The apparatus 50 comprises a memory 51 and a processor 52. The apparatus may, for example, be a network entity (e.g., a base station). The processor 52 splits the first individual message and the second individual message, and combines the common parts of each of the rate-split messages into a common message. The processor 52 assigns a common group identifier to the devices associated with the common message and then scrambles the common message using the common group identifier, before transmitting the scrambled common message.

Figure 6:
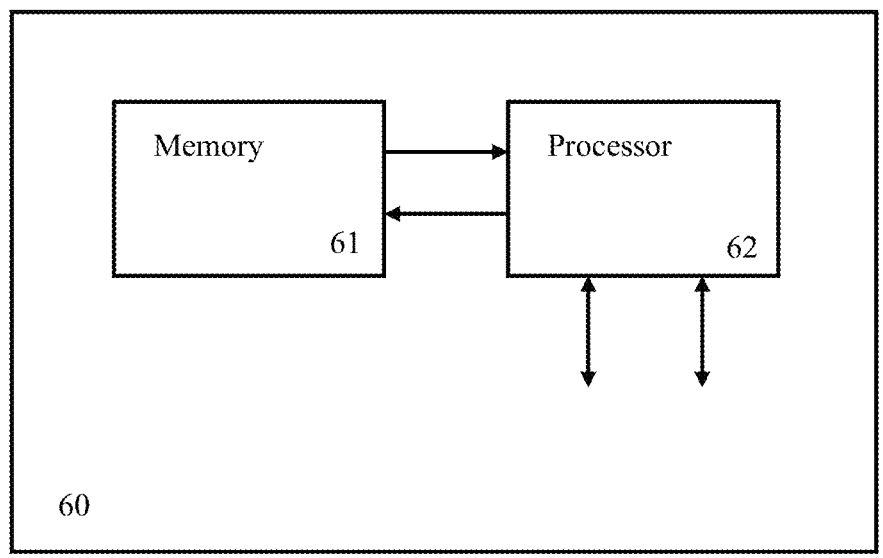
FIG. 6 is a block diagram of main apparatus components according to an embodiment of an aspect of the disclosure.

FIG. 6 shows a block diagram of main apparatus components according to an embodiment of an aspect of the disclosure. The apparatus may, for example, be a wireless device (e.g., a user equipment). The apparatus 60 comprises a memory 61 and a processor 62. The processor 62 receives a first signal comprising a scrambled common message, which comprises part of a rate-split message associated with the apparatus 60. The processor also receives a common group identifier and descrambles the common message using the common group identifier. FIGS. 5 and 6 are provided for exemplary purposes only and apparatuses according to aspects of the disclosure may comprise more components and/or may be arranged differently.

Aspects comprise rate-splitting individual messages associated with wireless devices (users), e.g., messages intended for a wireless device, such as a user equipment. A network entity (e.g., gNB) will transmit a common stream that is supposed to be decoded by all or a subset of the UEs in addition to the private streams which are intended for each UE. Rate-splitting techniques may be beneficial in communications such as, for example, broadcast channel. Rate-splitting techniques have been shown to achieve a larger degree of freedom and capacity, and are being considered as a strong candidate for the 6G/5G-advanced standard. The rate-splitting may be rate-splitting MIMO.

In rate-splitting techniques, messages of the individual users are split/divided into common and private parts. That is, each individual message associated with a user is split into a common part and a private part. The common parts of individual messages of two or more users (wireless devices) are combined (e.g., concatenated) to provide a common message. The common parts of the individual messages are not necessarily the same and may be considered 'common' in that they are to be combined into the common message, rather than because the content is common across the individual messages. When each wireless device descrambles the common message, the device will utilize the data relevant to that device and discard any other data, i.e. the data relevant to other devices. An individual message may be split into a common part and private part in any way and the specific approach to splitting the message may, for example, be application specific. The data comprised in the private part may or may not, for example, be sensitive data, i.e. data that should remain private to the intended user. The content of the common message does not alter the operation of communication methods according to aspects of the disclosure.

Legacy scrambling techniques rely on identifiers such as $n_{RNTI}$ and $N_{ID}$, which are user specific via RRC, yet the common messages need to be decoded by a group of users. The scrambling sequences of the common messages therefore need to be known at the users and so UE dependent scrambling may not be applied to a common TB. Such a problem may be more tied to the rate-splitting scenario as the current formula provides two different initializations for the scrambling sequences for the two different codewords.

By using an identifier that is common to a group of UEs (e.g., the UE's associated with the common message) in the initialization of the scrambling sequence, the scrambled common message may be decodable by all of the relevant users.

Figure 7:
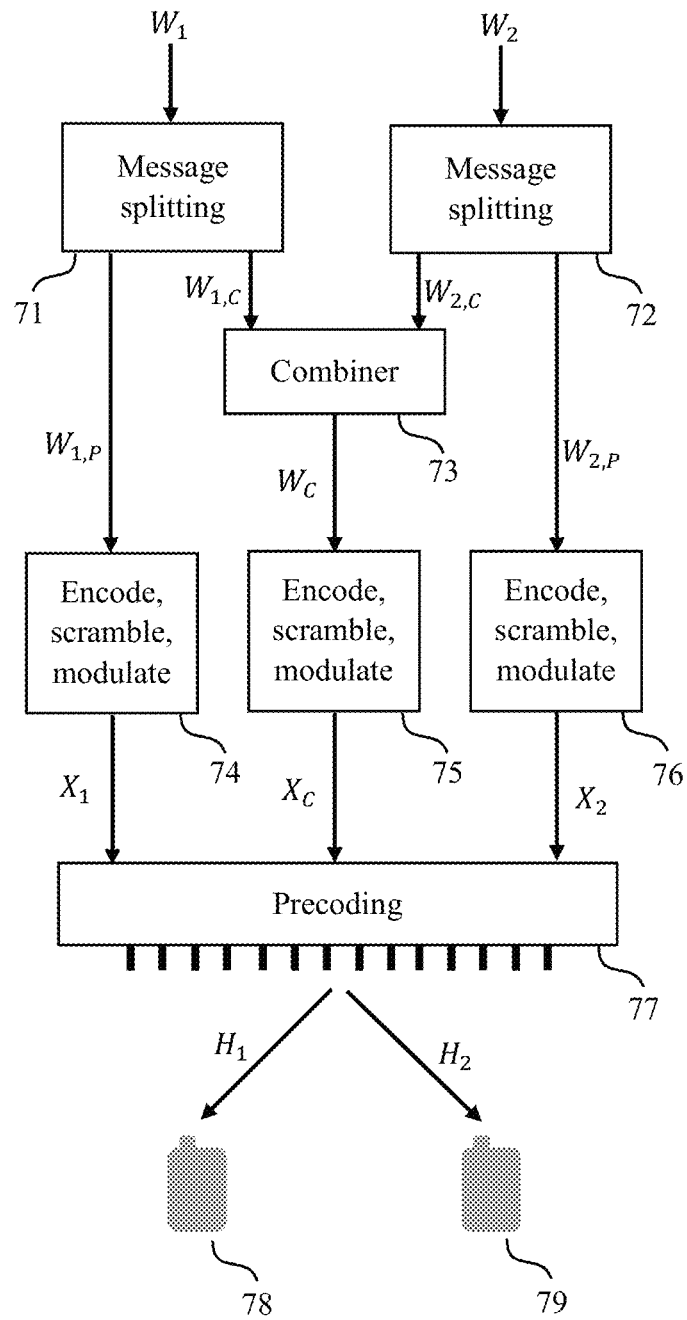
FIG. 7 is a flow diagram of the processing performed at a network entity according to an embodiment of an aspect of the disclosure.

FIG. 7 shows a flow diagram of the processing performed at a network entity according to an embodiment of an aspect of the disclosure. The processing comprises rate-splitting individual messages, combining the common parts, and encoding (including scrambling) and precoding the private parts and the combined common parts.

The messages of the individual users are initially split into common and private parts. More specifically, individual message $W_1$ is split into a common part $W_{1,C}$ and a private part $W_{1,P}$ at block 71. Similarly, individual message $W_2$ is split into a common part $W_{2,C}$ and a private part $W_{2,P}$ at block 72. The common part of individual messages of two or more UEs are concatenated into a common message. In FIG. 7, the common part $W_{1,C}$ is combined with the common part $W_{2,C}$ at block 73 to provide a common message $W_C$.

The private parts of the individual messages and the common message are then separately encoded, scrambled and modulated. The private part $W_{1,P}$ is encoded, scrambled and modulated at block 74 and the private part $W_{2,P}$ is encoded, scrambled and modulated at block 76. The scrambling may comprise use of data scrambling initialization equation (2) discussed above. This provides private streams $X_1$ and $X_2$ respectively for the corresponding UE. The common message $W_C$ is encoded, scrambled and modulated at block 75 to provide a common stream $X_C$. The scrambling may comprise use of data scrambling initialization equation (1) discussed above. The common stream $X_C$ and the private streams $X_1$ and $X_2$ can have one or more layers. Blocks 74, 75 and 76 may therefore also include mapping to one or more layers. It may be considered that the scrambling is part of the encoding, with the scrambling performed just before the modulation (e.g., mapping bits to QAM symbols).

The streams are then precoded at block 77. The common stream $X_C$ is precoded by $P_C$, the first private stream $X_1$ is precoded by $P_1$ and the second private stream $X_2$ is precoded by $P_2$. The output signal of the precoding block 77 can therefore be seen as:

$$X=P_CX_C+P_1X_1+P_2X_2$$

The precoded common streams are then transmitted by transmit (Tx) antennas to the users 78, 79. This may be from one network entity (e.g., TRP/gNB) or from multiple network entities, e.g., in a Coordinated Multipoint (CoMP) scenario. That is, the Tx antennas may be across one or more network entities (e.g., TRPs). Such a scenario may be applicable to a MU-MIMO scenario and may increase the achievable sum rate in some cases. For example, the precoded streams may be transmitted by an antenna $H_1$ to the wireless device (e.g., UE) 78, with the signal seen as:

$$Y_1=H_1P_CX_C+H_1P_1X_1+H_1P_2X_2+N_1$$

where $N_1$ is a noise term representing noise at the receiver, such as, for example, thermal noise.

The processing at the network entity may therefore comprise encoding, scrambling, modulation and precoding for the common message and each of the private messages.

Figure 8:
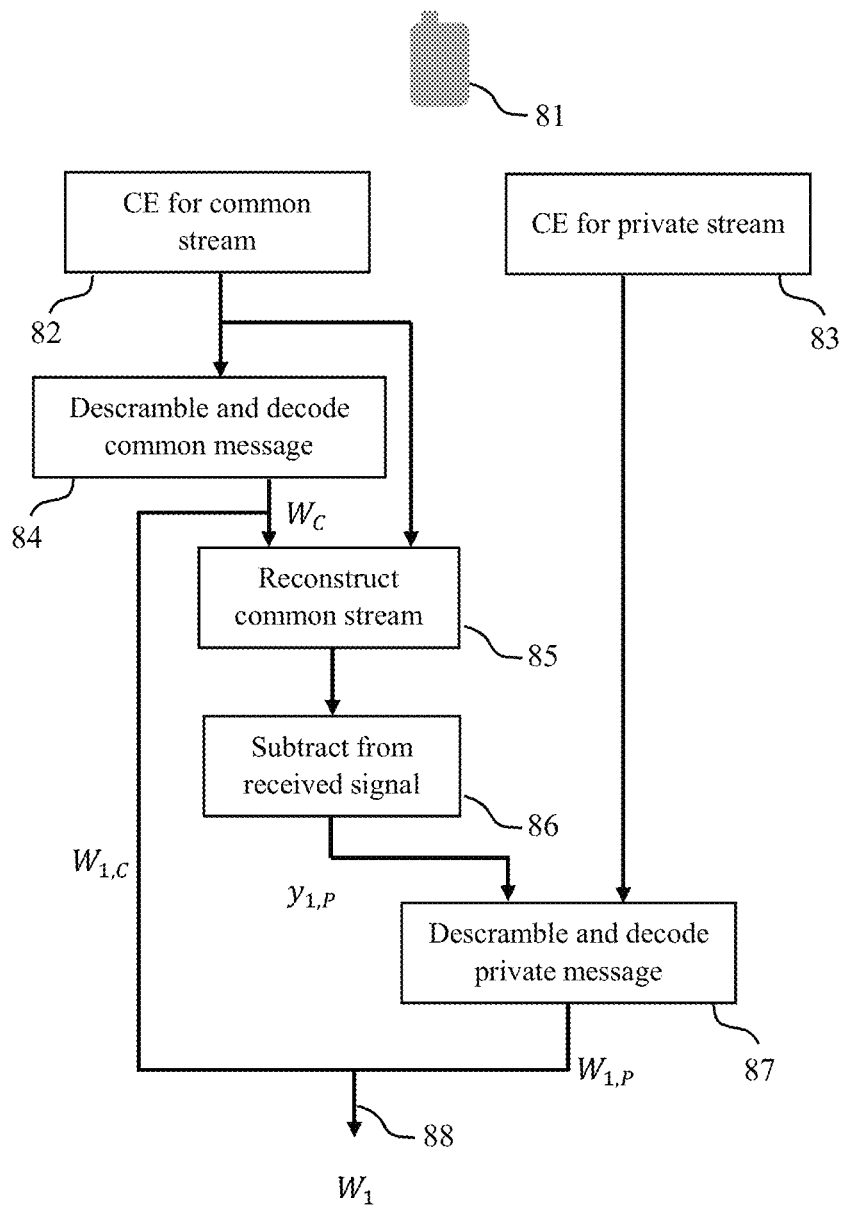
FIG. 8 is a flow diagram of the processing performed at a wireless device according to an embodiment of an aspect of the disclosure.

FIG. 8 shows a flow diagram of the processing performed at a wireless device according to an embodiment of an aspect of the disclosure. The processing shows channel estimation, decoding and successive interference cancelation. The processing shown relates to a single wireless device but other devices associated with the common message may perform the same or similar processing. That is, the common stream will be assumed to be decoded by all users associated with the common message, i.e. each user which has a (common) part of an individual message included in the common message. After decoding the common stream, each UE will perform processing such as, for example, successive interference cancelation and aim to decode the private stream so as to obtain the individual message.

The processing shown in FIG. 8 is performed at the receiver side where the wireless device (e.g., UE) 81 first decodes the common message. Decoding the common message serves two purposes: firstly, it is to obtain the common part of the individual message related to the UE that is included in the common message; and secondly, it is for use in successive interference cancelation for decoding the private part of the message.

As discussed above, some part of the individual message for each UE ($W_{1,C}$ and $W_{2,C}$) is embedded in common message ($W_C$), which is the data intended for that UE. The signal is received by UE 81 and channel estimation is performed for the common stream at block 82. The common stream is then descrambled and decoded at block 84 to provide the common part $W_{1,C}$ of the individual message. That is, UE 81 estimates the effective channel corresponding to the common stream ($H_1P_C$) and descrambles/decodes the common message $W_C$. It can therefore be seen that the common message may be encoded, scrambled, modulated and precoded at the transmission side (e.g., at the base station), and then descrambled and decoded at the receiver side (e.g., at the UE). The private part of the message may be similarly processed.

At block 85, the UE 81 reconstructs the common stream as part of the successive interference cancelation and then subtracts the reconstructed signal from the received signal at block 86. In other words, the UE 81 re-encodes to common stream $X_C$, multiplies by the estimated effective channel and subtracts this from the received signal. Assuming perfect channel estimation and successful decoding (with the estimated channel $\hat{H}_1$ used since the actual channel realization is not known to the UE):

$$Y_{1,P}=Y_1-\hat{H}_1P_CX_C=(H_1-\hat{H}_1)P_1X_1+H_1P_2X_2+N_1$$

where $N_1$ is a noise term representing noise at the receiver, such as, for example, thermal noise.

The UE 81 then decodes the private message at block 87 using $Y_{1,P}$ to provide the private part of the individual message $W_{1,P}$. The common part and the private part are then combined to provide the individual message $W_1$ for UE 81.

It can therefore be seen that having clean channel estimation of the common stream ($H_1P_C$) is very important to rate-splitting schemes. It not only helps to increase the chance of decoding the common message successfully but, more importantly, it is also needed to reconstruct the common message for successive interference cancelation.

The processing at the network entity (e.g., base station) and the wireless device (e.g., user equipment) may be performed in accordance with the relevant standards, such as, for example, 3GPP TS 38.211. For example, the encoding, scrambling, modulating, mapping and precoding, and/or the descrambling, decoding and successive interference cancelation may be performed in line with 3GPP TS 38.211, section 7.3.1.

Embodiments of aspects may therefore provide methods for wireless communication, along with associated apparatuses and computer-readable mediums, for processing rate-split messages, where the processing comprises data scrambling and descrambling. A common identifier that is common to a group of users may be used in the processing such that each of the users of the common group are able to descramble the common data and successfully receive and reconstruct individual messages.

Figure 9:
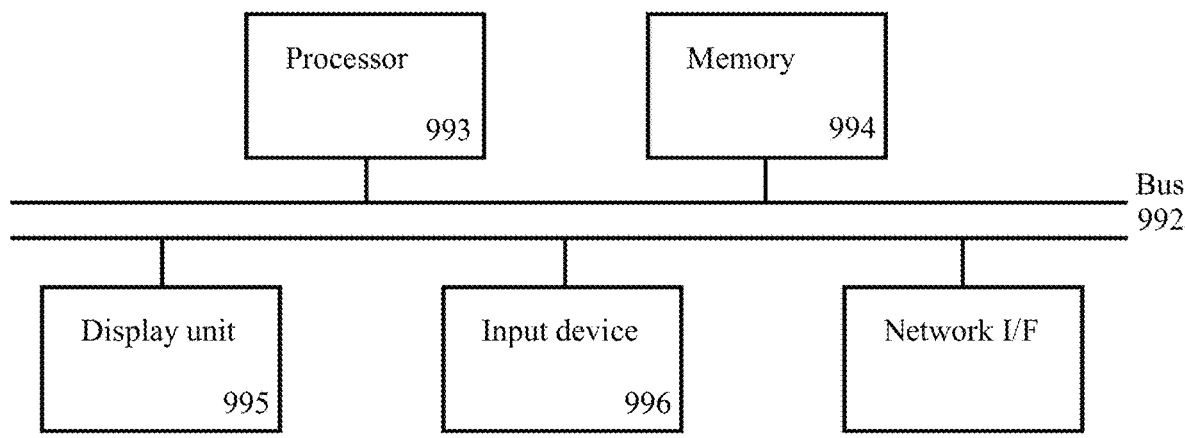
FIG. 9 is a hardware diagram illustrating hardware that may be used to implement embodiments of aspects.

FIG. 9 is a block diagram of a computing device, such as a wireless device or network entity incorporating resources suitable for implementing methods of wireless communication, which may embody aspects of the present disclosure, and which may be used to implement some or all of the steps of a method embodying the present disclosure, and perform some or all of the tasks of an apparatus of an embodiment. For example, the computing device of FIG. 9 may be used to implement all, or only some, of steps of the method illustrated in FIG. 3 and/or FIG. 4, and to perform all, or only some, of the tasks of the apparatus shown in FIG. 5 and/or FIG. 6. The computing device comprises a processor 993, and memory 994. Optionally, the computing device also includes a network interface 997 for communication with other computing devices, for example with other computing devices of embodiments.

For example, an embodiment may be composed of a network of such computing devices. Optionally, the computing device may also include one or more input mechanisms 996 and a display unit 995. The input mechanisms 996 may enable a user to input data and instructions to the computing device. The components are connectable to one another via a bus 992.

The memory 994 may include a computer-readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions described here and in the claims. The memory 994 stores data being read and written by the processor 993, such as the inputs, interim results and results of the processes referred to above. As referred to herein, a processor may include one or more general purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device. The display unit 995 and input mechanisms 996 may form the output.

The network interface (network I/F) 997 may be connected to a network, such as the Internet, and may be connectable to other such computing devices via the network. The network I/F 997 may control data input/output from/to other apparatus via the network. Other peripheral devices such as microphone, speakers, power supply unit, etc. may be included in the computing device.

Methods embodying the present disclosure may be carried out on a computing device such as that illustrated in FIG. 9. Such a computing device need not have every component illustrated in FIG. 9 and may be composed of a subset of those components. A method embodying the present disclosure may be carried out by a single computing device in communication with one or more data storage servers via a network. The computing device may be a data storage itself storing the input content before and after processing and thus for example, the dialogue and/or trained model.

A method embodying the present disclosure may be carried out by a plurality of computing devices operating in cooperation with one another. One or more of the plurality of computing devices may be a data storage server storing at least a portion of the data.

Embodiments of aspects may be applied to any field in which processing comprising data scrambling is applied to wireless communications using rate-splitting techniques. Embodiments of aspects may preferably be applied to telecommunications fields.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Variations to the disclosed embodiments may be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above-described embodiments of the present disclosure may advantageously be used independently of any other of the embodiments or in any feasible combination with one or more others of the embodiments.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method for wireless communication at a network entity, the method comprising:
   splitting a first individual message associated with a first device into at least a first common part and a first private part;
   splitting a second individual message associated with a second device into at least a second common part and a second private part;
   combining the first common part and the second common part to provide a common message;
   assigning a common group identifier to a group of devices comprising the first device and the second device;
   processing the common message, wherein the processing comprises scrambling the common message using the common group identifier; and
   transmitting the scrambled common message to the group of devices.

2. The method of claim 1, wherein the common group identifier is configured using radio resource control.

3. The method of claim 1, wherein:
   the common group identifier is a cell identifier; and
   the cell identifier is an identifier of cell provided by the network entity.

4. The method of claim 1, wherein:
   the common group identifier is offset from a cell identifier; and
   the cell identifier is an identifier of cell provided by the network entity.

5. The method of claim 1, wherein the common message is scrambled using the following equation:

$$c_{init} = nRNTI \cdot 2^{15} + q \cdot 2^{14} + NIDc$$

where
   nRNTI is a radio network temporary identifier associated with the downlink control information scheduling the transmission of the scrambled common message,
   q is an identifier to indicate that the equation relates to the common message, and
   NIDc is the common group identifier.

6. The method of claim 5, comprising generating the radio network temporary identifier prior to scrambling the common message, wherein the radio network temporary identifier is different to a cell radio network temporary identifier.

7. The method of claim 1, comprising configuring a radio network temporary identifier, wherein the radio network temporary identifier is the same for the group of devices.

8. The method of claim 1,
   comprising: generating the common group identifier,
   wherein:
   the common group identifier is different to a cell identifier; and
   the cell identifier is an identifier of cell provided by the network entity.

9. The method of claim 1, wherein processing the common message further comprises one or more of:
   encoding the common message;
   modulating the common message;
   mapping the common message to one or more transmission layers; and
   precoding the common message.

10. The method of claim 1, comprising:
    assigning a first identifier to the first device;
    processing the first private part, wherein the processing comprises scrambling the first private part using the first identifier; and
    transmitting the scrambled first private part to the first device.

11. The method of claim 10, wherein the first private part is scrambled using the following equation:

$$c_{init} = nRNTI \cdot 2^{15} + q \cdot 2^{14} + NID$$

where
   nRNTI is a radio network temporary identifier associated with the downlink control information scheduling the transmission of the processed first private part, q is a codeword index, and
NID is the first identifier.

12. The method of claim 11, wherein the radio network temporary identifier is a cell radio network temporary identifier.

13. The method of claim 10, wherein:
processing the first private part further comprises one or more of:
encoding the first private part;
modulating the first private part;
mapping the first private part to one or more transmission layers; and
precoding the first private part.

14. The method of claim 1, comprising:
assigning a second identifier to the second device;
processing the second private part, wherein the processing comprises scrambling the second private part using the second identifier; and
transmitting the scrambled second private part to the second device.

15. The method of claim 14, wherein:
processing the second private part further comprises one or more of:
encoding the second private part;
modulating the second private part;
mapping the second private part to one or more transmission layers; and
precoding the second private part.

16. The method of claim 1, wherein:
the network entity is one of a plurality of network entities; and
the scrambled common message is transmitted to another network entity of the plurality of network entities.

17. A method for wireless communication at a wireless device, the method comprising:
receiving a first signal comprising a common message, wherein the common message comprises a first part of a rate-split message associated with the wireless device;
receiving a common group identifier;
processing the common message, wherein the processing comprises descrambling the common message using the common group identifier;
receiving a second signal comprising a private message, the private message comprising a second part of the rate-split message;
receiving a device identifier associated with the wireless device; processing the private message, wherein the processing comprises
descrambling the private message using the device identifier and the descrambled common message; and
decoding the rate-split message based at least in part on processing the common message and on processing the private message.

18. The method of claim 17, wherein the common group identifier is configured using radio resource control.

19. The method of claim 17, wherein the common group identifier is associated with a group of devices comprising the wireless device.

20. The method of claim 17, wherein the common message and the common group identifier are received from a network entity.

21. The method of claim 17, wherein descrambling the private part comprises using successive interference cancelation.

22. The method of claim 21, wherein the successive interference cancelation comprises:

estimating an effective first channel corresponding to the received first signal;
reconstructing the descrambled common message to provide a reconstructed signal;
multiplying the reconstructed signal by the estimated effective channel to provide a multiplied signal;
subtracting the multiplied signal from the received first signal to provide a subtracted signal; and
descrambling the private part using the subtracted signal, the device identifier and the estimated effective second channel.

23. The method of claim 17, comprising combining the descrambled common message and the processed private part of the rate-split message to provide an individual message associated with the wireless device.

24. The method of claim 17, wherein the device identifier is received from a network entity and is different to the common group identifier.

25. The method of claim 17, wherein the device identifier is configured using radio resource control.

26. The method of claim 17, wherein the device identifier is uniquely associated with the wireless device.

27. The method of claim 17, wherein:
the common group identifier is a cell identifier;
the cell identifier is an identifier of a cell provided by a network entity; and
the wireless device is located in the cell.

28. An apparatus for wireless communication at a network entity, the apparatus comprising:
means for splitting a first individual message associated with a first device into at least a first common part and a first private part;
means for splitting a second individual message associated with a second device into at least a second common part and a second private part;
means for combining the first common part and the second common part to provide a common message;
means for assigning a common group identifier to a group of devices comprising the first device and the second device;
means for processing the common message, wherein the processing comprises scrambling the common message using the common group identifier; and
means for transmitting the scrambled common message to the group of devices.

29. An apparatus for wireless communication at a wireless device, the apparatus comprising:
means for receiving a first signal comprising a common message, wherein the common message comprises a first part of a rate-split message associated with the wireless device;
means for receiving a common group identifier;
means for processing the common message, wherein the processing comprises descrambling the common message using the common group identifier;
means for receiving a second signal comprising a private message, the private message comprising a second part of the rate-split message;
means for receiving a device identifier associated with the wireless device; means for processing the private message, wherein the processing comprises
descrambling the private message using the device identifier and the descrambled common message; and
means for decoding the rate-split message based at least in part on processing the common message and on processing the private message.

* * * * *